United States Patent
Nilsson

(10) Patent No.: US 11,671,885 B2
(45) Date of Patent: Jun. 6, 2023

(54) RESTRICTION BASED HANDOVER

(71) Applicant: Telefonaktiebolaget LM Ericsson (publ), Stockholm (SE)

(72) Inventor: Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 61 days.

(21) Appl. No.: 16/592,387

(22) Filed: Oct. 3, 2019

(65) Prior Publication Data
US 2021/0105680 A1 Apr. 8, 2021

(51) Int. Cl.
| | |
|---|---|
| H04W 36/16 | (2009.01) |
| H04W 36/00 | (2009.01) |
| H04B 17/318 | (2015.01) |
| H04W 36/08 | (2009.01) |
| H04W 36/30 | (2009.01) |
| H04W 36/32 | (2009.01) |

(52) U.S. Cl.
CPC .... *H04W 36/00837* (2018.08); *H04B 17/318* (2015.01); *H04W 36/0058* (2018.08); *H04W 36/0077* (2013.01); *H04W 36/0094* (2013.01); *H04W 36/08* (2013.01); *H04W 36/30* (2013.01); *H04W 36/32* (2013.01)

(58) Field of Classification Search
None
See application file for complete search history.

(56) References Cited

U.S. PATENT DOCUMENTS

2013/0331103 A1* 12/2013 Yang ............... H04W 36/0083 455/436
2013/0336288 A1* 12/2013 Tu .................... H04W 36/0077 370/331

(Continued)

FOREIGN PATENT DOCUMENTS

WO 2018/188729 A1 10/2018

OTHER PUBLICATIONS

International Search Report and Written Opinion issued in International Application No. PCT/EP2020/076058 dated Dec. 4, 2020 (18 pages).

(Continued)

*Primary Examiner* — Brandon M Renner
(74) *Attorney, Agent, or Firm* — Rothwell, Figg, Ernst & Manbeck, P.C.

(57) ABSTRACT

Performing restricted based handover. In one aspect, there is a method performed by a user equipment (UE) served by a serving network node. The method comprises determining that a handover condition exists, wherein the handover condition is a handover triggering condition or a handover inhibiting condition. The method further comprises as a result of determining that the handover triggering condition exists, triggering a handover of the UE from the serving network node to a target network node, or as a result of determining that the handover inhibiting condition exists, inhibiting a handover of the UE from the serving network node to the target network node. Determining that the handover condition exists comprises: determining that a power restriction exists i) for an UL channel between the UE and the serving network node or ii) for an UL channel between the UE and the target network node.

13 Claims, 9 Drawing Sheets

(56) References Cited

U.S. PATENT DOCUMENTS

| | | | | |
|---|---|---|---|---|
| 2014/0045500 | A1* | 2/2014 | Dimou | H04W 36/30 455/436 |
| 2014/0064253 | A1* | 3/2014 | Deivasigamani | H04W 36/00837 370/332 |
| 2014/0098693 | A1 | 4/2014 | Tabet et al. | |
| 2014/0200003 | A1 | 7/2014 | Kodali et al. | |
| 2014/0257695 | A1* | 9/2014 | Annapureddy | G08G 1/096811 701/537 |
| 2015/0003310 | A1* | 1/2015 | Ko | H04W 52/0225 370/311 |
| 2016/0373971 | A1* | 12/2016 | Kulal | H04W 36/0061 |
| 2017/0318542 | A1* | 11/2017 | Zhang | H04W 52/146 |
| 2019/0104549 | A1* | 4/2019 | Deng | H04B 7/0617 |
| 2019/0306775 | A1* | 10/2019 | Duan | H04W 56/0045 |
| 2020/0037183 | A1* | 1/2020 | Ganu | H04W 24/08 |
| 2020/0037254 | A1* | 1/2020 | Comsa | H04W 52/365 |

OTHER PUBLICATIONS

OPPO, "Discussion on the MPE (Maximum Permissible Exposure) issue", 3GPP TSG RAN WG1 Ad-Hoc Meeting 1901, R1-1900296, Taipei, Jan. 2019 (5 pages).

ETSI, "5G; NR; Radio Resource Control (RRC); Protocol specification" (3GPP TS 38.331 version 15.6.0 Release 15), ETSI TS 138 331, V15.6.0 (Jul. 2019) Technical Specification, Jul. 2019 (516 pages).

* cited by examiner

RESTRICTION BASED HANDOVER

TECHNICAL FIELD

Disclosed are embodiments related to devices and methods for performing restriction based handovers.

BACKGROUND

1. The Synchronization Signal Block (SSB)

A network node of a radio access network (RAN), such as a base station or transmission and reception point (TRP), broadcasts a synchronization signal block (SSB) that provides synchronization information and other information used for initial access. The SSB is also used by user equipments (UEs) to perform mobility measurements.

An exemplary structure of an SSB 200 is shown in FIG. 2. In FIG. 2, SSB 200 comprises one primary synchronization signal (PSS), one secondary synchronization signal (SSS), and a physical broadcast channel (PBCH). The PSS and SSS parts of the SSB may be transmitted over 127 sub-carriers, where the spacing of the sub-carriers can be 15/30 kHz for a frequency below 6 GHz and 120/240 kHz for a frequency above 6 GHz.

When a low frequency is used for signal transmission, a base station may transmit one SSB 302 that covers the whole cell, as shown in FIG. 3A, and when a high frequency is used for signal transmission, a base station may need to transmit multiple beamformed SSBs 352 to attain coverage over the whole cell, as shown in FIG. 3B, In transmitting multiple beamformed SSBs, the max number of SSBs per a cell can be: 4 when a transmission frequency is below 3 GHz, 8 when the transmission frequency is in the range of 3-6 GHz, and 65 when the transmission frequency is above 6 GHz. The SSBs may be transmitted in a SSB transmission burst which may last up to 5 ms. The periodicity of the SSB transmission burst may be configurable with the following options: 5, 10, 20, 40, 80, and 160 ms.

2. Handover.

The decision as to whether or not to handover of a UE from a serving network node to a target network node is based on measurements of down link (DL) references signals transmitted by the network nodes.

In some networks the reference signals are channel state information reference signal (CSI-RS). In other network (e.g., NR) the reference signals are the SSS part of the SSB. Because SSB is transmitted for initial access and synchronization purposes, using SSB for mobility measurements eliminates the extra overhead using CSI-RS.

The mobility measurement may be performed based on a measurement of reference signal received power (RSRP) of the SSS part of the SSB. The RSRP measurement from a respective cell may be filtered using the layer 3 filtering (as specified in section 5.5.3.3 of 3GPP TS 38.331 V15.6.0 ("TS 38.331")). The layer 3 filtering may be implemented using the equation—$F_n=(1-a) \times F_{n-1}+a \times M_n$, where $M_n$ is the latest received measurement, $F_n$ is the updated filtered measurement result, and $F_{n-1}$ is the old filtered measurement result. The parameter "a" defines how much of the latest received measurement should be weighted compared to the old filtered measurement result.

By setting the parameter "a" to an appropriate value, the mobility measurement with the layer 3 filtering can get rid of fast fading effects that can cause ping pong effects— continuous unwanted handovers of a UE between two or more cells.

Reporting of the result of a mobility measurement from a UE to a network node in NR may occur periodically or based on an occurrence of an event.

For the periodic reporting, a network node may configure UEs to report mobility measurements periodically for all neighboring cells detected on an associated frequency. The number of cells for which mobility measurements are reported by UEs may be limited to be less than a particular number (e.g., the parameter "maxCellReport" disclosed in TS 38.331)

For the event triggered reporting, a UE may be configured to report mobility measurements for all cells that are defined by a particular parameter (e.g., the parameter "triggeredCellsList"). Additionally, like the periodic reporting, the number of cells for which mobility measurements are reported by the UE may be limited to be less than a particular number.

The event triggered reporting may occur when a number of conditions are met. Some of the conditions are described in section 5.5.4 of TS 38.331. There are 6 different event triggers, A1-A6, for NR, as described in section 5.5.4 in TS 38.331. The basic idea is that the UE sends an event triggered mobility report when the mobility measurement for a neighbouring cell is stronger than the mobility measurement for the serving cell+a certain threshold (the threshold is used to reduce ping pong effects).

In case the server network node detects (through a mobility measurement report from the UE) that the signal received at the UE from a neighboring cell is stronger than the signal received at the UE from a serving cell, the serving network node may initiate a handover over process that results in a handover of the UE from the serving cell to the neighboring cell. An exemplary handover process 400 is shown in FIG. 4.

3. Antenna Configurations

A UE may receive signals from different directions. Thus, it may be beneficial for a UE to have an antenna implementation which is capable of generating omni-directional-like coverage as well as high gain narrow beams. One way to increase the omni-directional-like coverage is to install multiple antennas/panels, and point the antennas/panels in different directions, as schematically illustrated in FIGS. 5A and 5B. FIG. 5A illustrates an antenna arrangement for a UE with 4 antennas and FIG. 5B illustrates an antenna arrangement for a UE with two panels.

4. Maximum Permissible Exposure (MPE)

In some situations it is desirable (or requirements) for a UE to restrict its output power for antennas/panels that transmit power towards sensitive objects, like for example a human body. It is possible that a subset of the UEs antennas are transmitting in a direction of a sensitive object and therefore have to reduce the maximum allowed output power, hence, in this case, different UE antennas will have different maximum allowed output power. To handle this a feature called Management Maximum Power Reduction (P-MPR) has been introduced, which basically tells how much the UE needs to reduce the output power below the maximum allowed output power due to RF exposure requirements. Initial discussion in 3GPP have indicated that that the required output power reduction value (i.e. Power Management Maximum Power Reduction (P-MPR) value) can be up to 15 dB, which would severely reduce the link budget for the affected UE antennas.

SUMMARY

In some situations, a UE may receive, via a first antenna arrangement of the UE, a DL reference signal transmitted by a serving network node and may detect that the received power of the reference signal is high, but the maximum allowed uplink (UL) power for the first antenna arrangement may be limited due to a non-zero P-MPR value. Such limitation in the maximum allowed UL power may lead to coverage and/or capacity problems in the UL transmission path (a.k.a., "channel") between the UE and the serving network node. In this situation it may be the case that the UE receives, via a second antenna arrangement, a DL reference signal transmitted by a target network node and the UE detects that the received power of this reference signal is also high, and the second antenna arrangement is not affected by P-MPR (i.e., the P-MPR for the second antenna arrangement is zero). That is, the UE may have the same DL performance with respect to the serving network node and the target network node, but the UL link budget for the UL channel between the UE and the target network node is greater than the UL link budget for the UL channel between the UE and the serving network node.

In such a situation it may better to serve the UE using the neighboring network node rather than the serving network node, particular if the UE has more than a threshold amount of data to transmit in the UL direction. But because mobility measurements on which a handover process is based are mainly based on downlink (DL) signals (e.g., SSB or CSI-RS), the UE may not be able to trigger the serving base station to initiate a handover of the UE from the serving network node to the target network node.

A similar problem can arise where i) the DL performance (e.g., DL path gain) of the transmission path between the target network node and the UE is greater than DL performance for the transmission path between the serving network node and the UE, which would conventionally lead to a handover of the UE from the serving to the target, but ii) the UL link budget for the UL channel between the UE and the target network node is much less than the UL link budget for the UL channel between the UE and the serving network node. In this scenario it may be better to inhibit the serving network node from initiating a handover of the UE form the serving to the target network node.

Accordingly, in some embodiments of this disclosure, the UE is configured to trigger a handover of the UE from the serving network node to the target network node based not only one measurement of the relevant DL reference signals, but also, for example, based on the link budget for the relevant UL channels.

In one aspect, there is a method performed by a user equipment (UE) served by a serving network node. The method comprises determining that a handover condition exists. The handover condition may be a handover triggering condition or a handover inhibiting condition. The method further comprises as a result of determining that the handover triggering condition exists, triggering a handover of the UE from the serving network node to a target network node, or as a result of determining that the handover inhibiting condition exists, inhibiting a handover of the UE from the serving network node to the target network node. Determining that the handover condition exists may comprise i) determining that a power restriction exists for the UL channel between the UE and the serving network node or ii) determining that a power restriction exists for the UL channel between the UE and the serving network node.

BRIEF DESCRIPTION OF THE DRAWINGS

The accompanying drawings, which are incorporated herein and form part of the specification, illustrate various embodiments.

DETAILED DESCRIPTION

As mentioned above, conventionally, the decision as to whether or not to handover of a UE from a serving network node to a target network node is based on measurements of down link (DL) references signals transmitted by the network nodes. But, as noted above, this can be problematic if either: i) the UE's UL channel to the serving network node is power limited or ii) the UE's UL channel to the target network node is power limited. This disclosure provides a solution.

Figure 1:
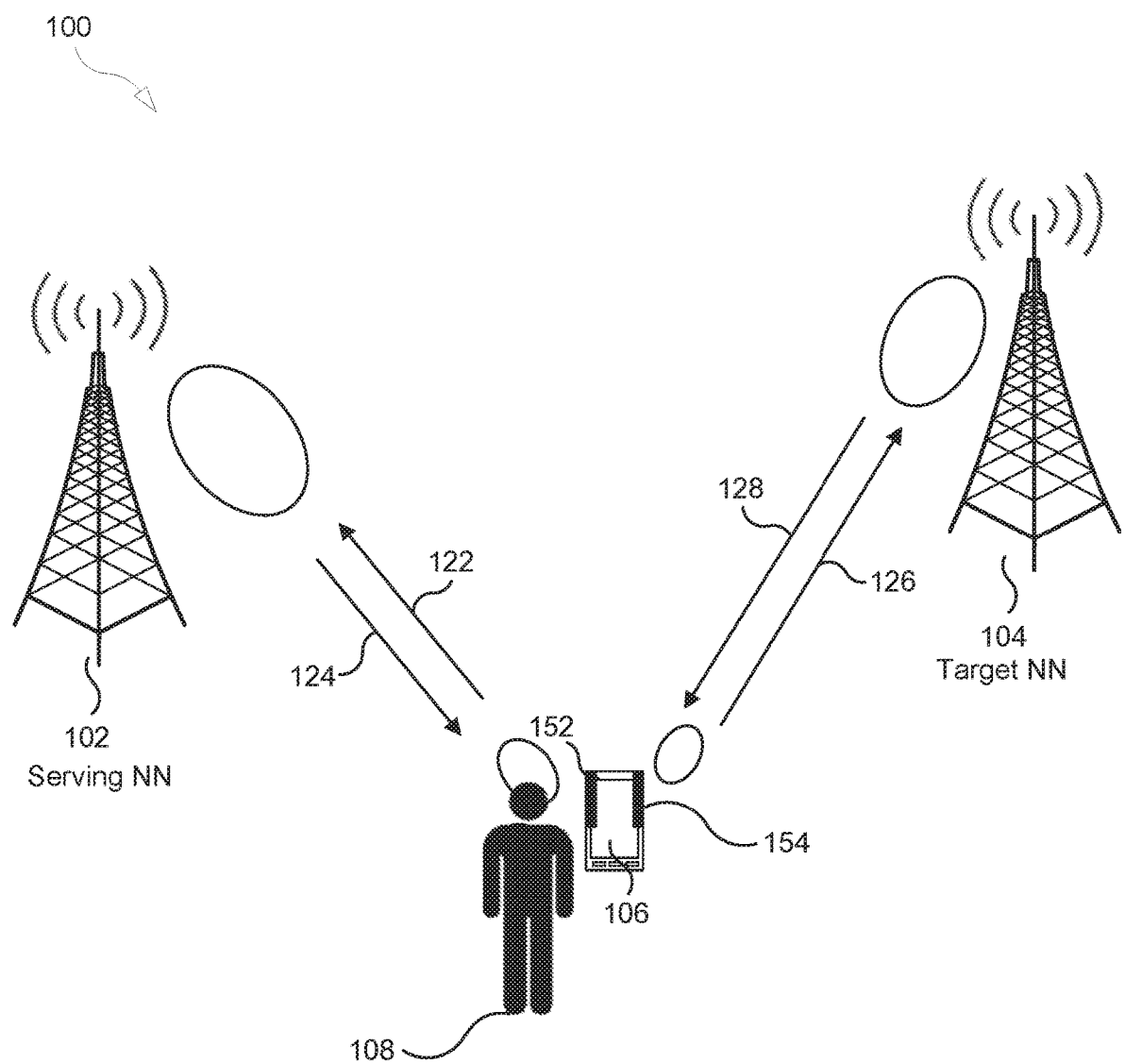
FIG. 1 illustrates a part of an exemplary communication system according to some embodiments.
Figure 2:
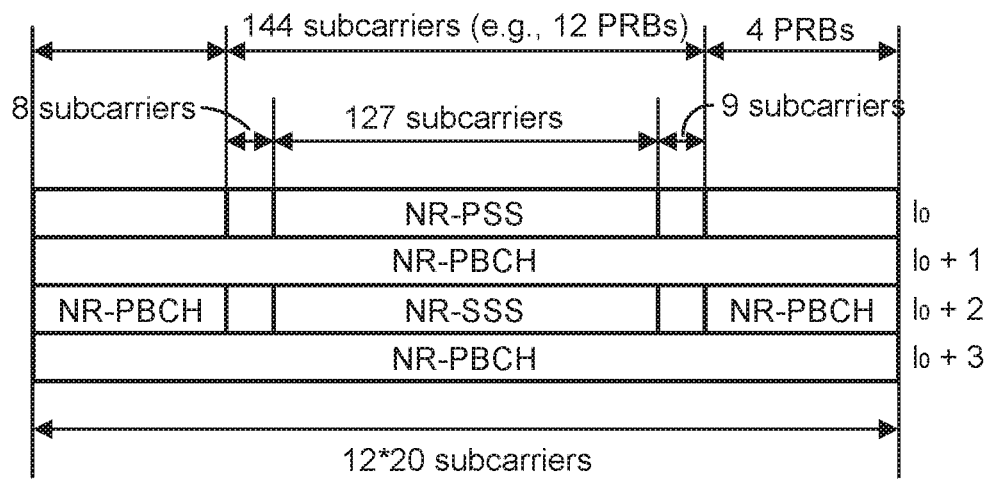
FIG. 2 shows an exemplary SSB.
Figure 3A:
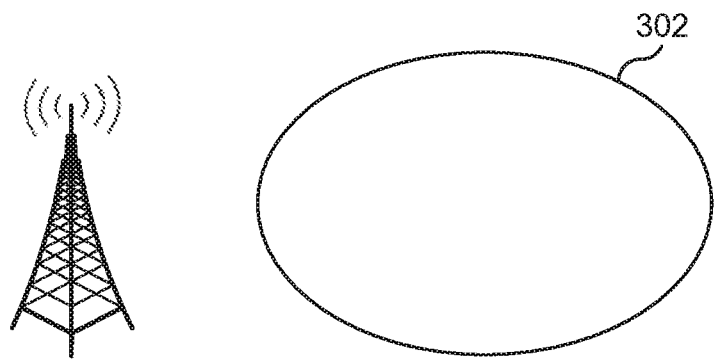
FIGS. 3A and 3B show different types of SSB.
Figure 3B:
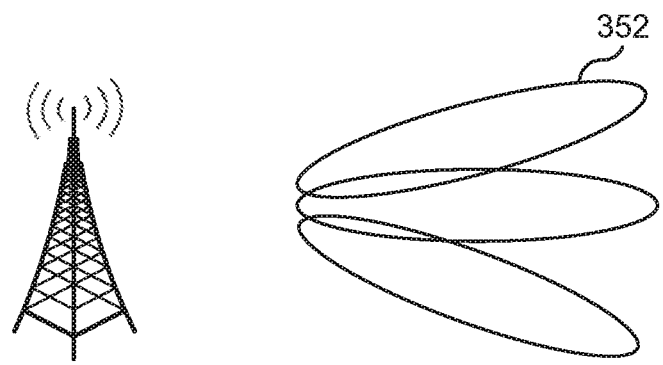
Figure 4:
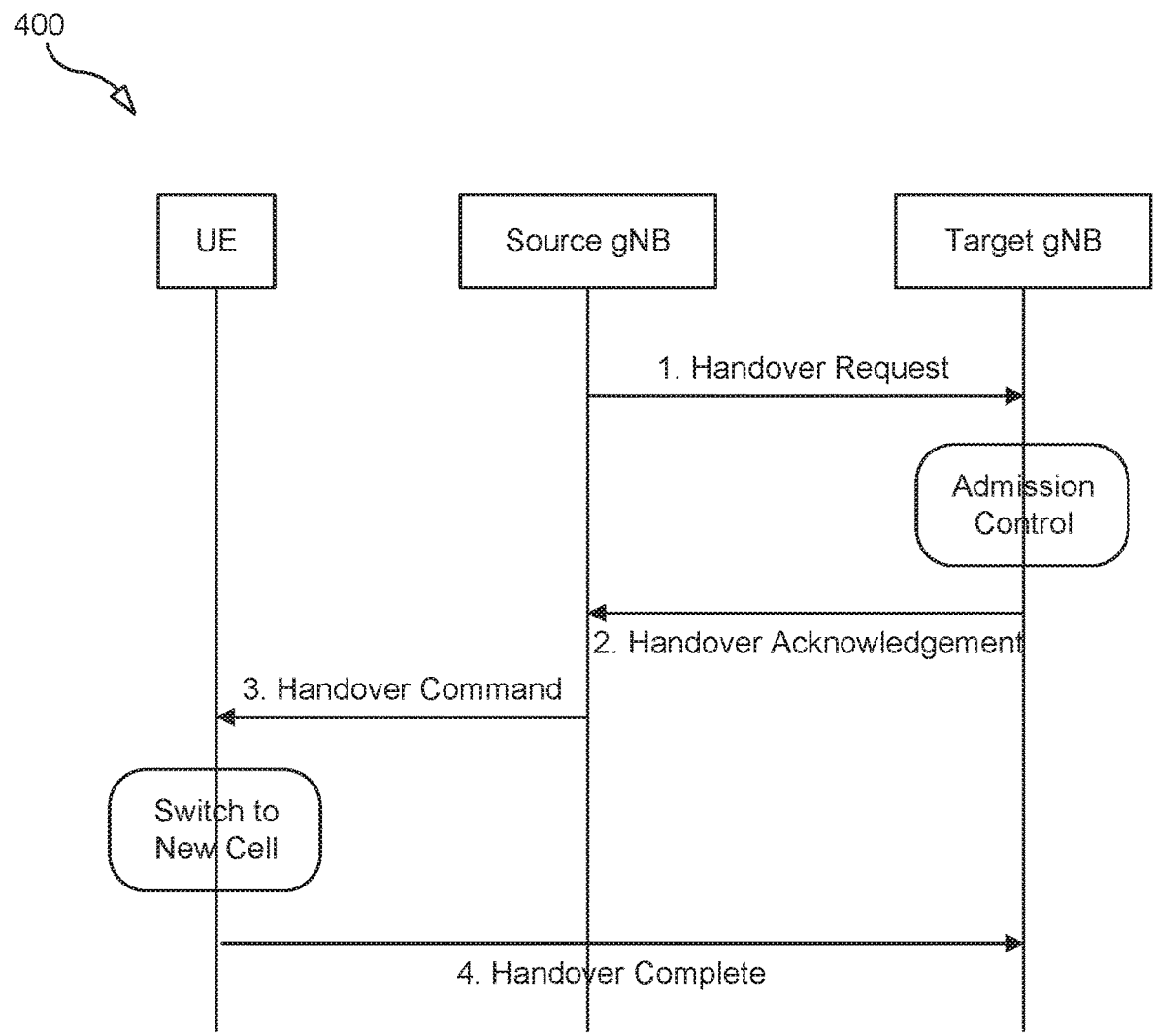
FIG. 4 is an exemplary handover process.
Figure 5A:
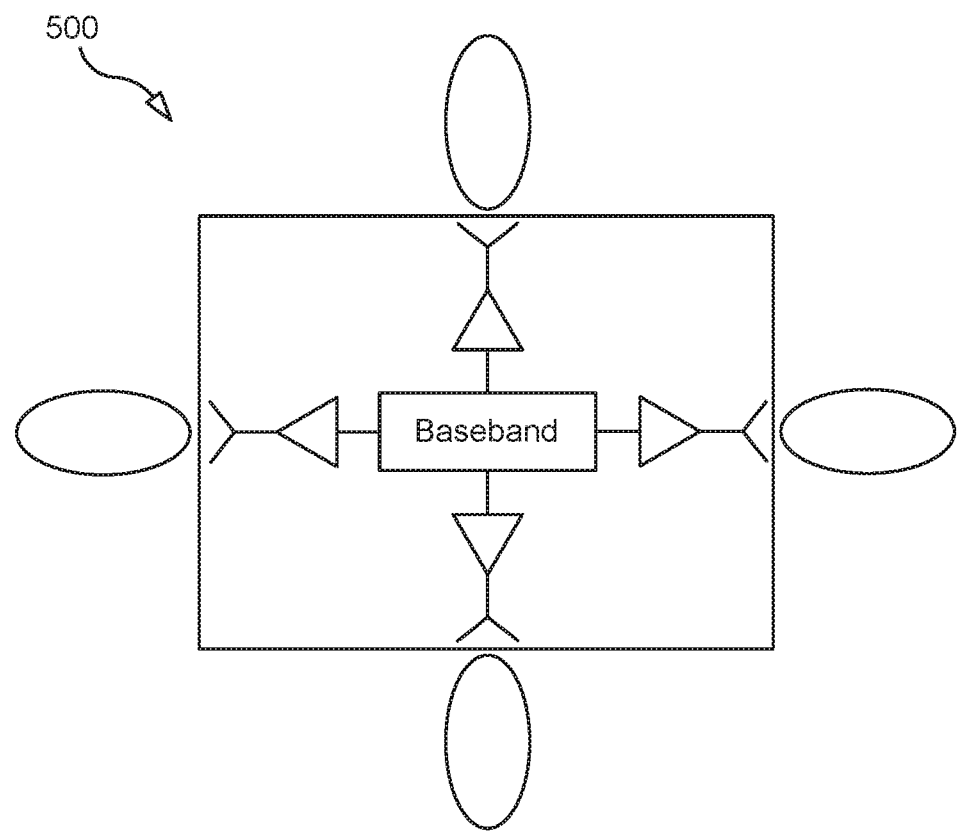
FIGS. 5A and 5B show different antenna arrangements.
Figure 5B:
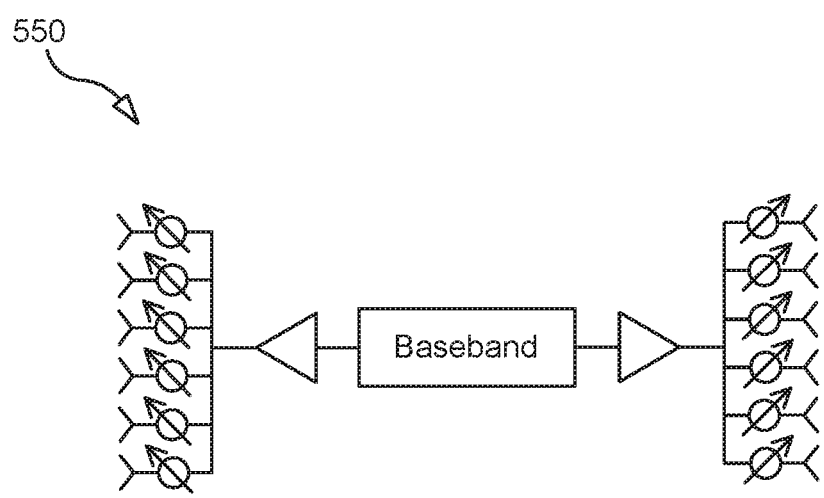

FIG. 1 shows an exemplary wireless communication system 100 according to some embodiments. The system 100 comprises a serving network node (NN) 102, a target NN 104, and a UE 106. In this example, UE 106 includes a first antenna arrangement (antenna arrangement) 152 and a second antenna arrangement 154. Each antenna arrangement may correspond to an individual antenna or an antenna panel. Two antenna arrangements are shown just for illustration as UE 106 may have a different number of antenna arrangements.

In the exemplary wireless communication system 100, UE 106 is capable of communicating with serving NN 102 using the first antenna arrangement 152 and UE 106 is capable of communicating with target NN 104 using the second antenna arrangement 154. In other exemplary wireless communication systems, however, UE 106 may be configured to use more than one antenna arrangement to communicate with a NN (either the serving NN 102 or the target NN 104). For example, depending on any one or a combination of scattering environment around the UE, pointing directions of antennas of the UE, locations of network nodes near the UE, the UE may selectively use any number of antenna arrangement to communicate with a NN.

UE 106 may be any device capable of connecting to a wireless network. For example, UE 106 may be a mobile phone, a tablet, a laptop, an internet of things (IoT) device, or any other computing device. Each of the NNs 102 and 104 may be any network entity that is capable of being involved in communicating with UE 106. In FIG. 1, each of the NNs 102 and 104 is a base station (e.g., a 5G base station ("gNB"), a 4G base station ("eNB")).

Conventionally, a handover of UE 106 from serving NN 102 to target NN 104 is typically performed when the performance of a downlink (DL) channel 128 (i.e. transmission path 128) between UE 106 and target NN 104 is better than the performance of a DL channel 124 between UE 106 and serving NN 102. More specifically, UE 106 transmits a measurement report when a measurement result (e.g., a filtered measurement result) for target NN 104 is offset better than a measurement result for serving NN 104 (see e.g., Event A3 described in section 5.5.4.4 of TS 38.331).

As is known in the art, UE 106 receives signals from serving NN 102 and target NN 104, and generates mobility measurement reports (MMRs) that contain information indicating characteristics of the reference signals (e.g., the strength of the received signals) received from serving NN 102 and characteristics of the reference signals (e.g., the strength of the received signals) received from target NN 104. After UE 106 generates an MMR, UE 106 transmits the MMR to serving NN 102. Based on the MMR, serving NN 102 may detect that the performance of the DL channel 128 is better than the performance of the DL channel 124 and, therefore, initiate a handover process for handing over the UE from the serving NN to the target NN. That is, for example, the MMR may indicate that a measurement result based on the power of the serving NN's reference signals as measured by UE 106 is threshold less than a measurement result based on the power of the target NN's reference signals as measured by UE 106.

Conventionally, when the performance of the DL channel 124 (i.e., the channel between serving NN 102 and UE 106) is better than the performance of the DL channel 128 (i.e., the channel between target NN 104 and UE 106), a handover of UE 106 from serving NN 102 to target NN 104 is not initiated. But, because the first antenna arrangement 152, which is used by UE 106 to communicate with serving NN 102, is close to a human body 108, it may be desirable (or it may be a requirement) to reduce the performance of UL channel 122 (e.g., reduce the link budget) such that less intensive signals are transmitted from the first antenna arrangement 152. Different methods may be used to configure the first antenna arrangement 152 to transmit less intensive signals. One of the methods is reducing the maximum allowed uplink (UL) output power of the first antenna arrangement 152. Reducing the maximum allowed UL output power of the first antenna arrangement 152 might result in reduced performance of the UL channel 122 between UE 106 and serving NN 102 and possibly even out-of-coverage for some UL signals.

In such a case where there is a reduced performance of the UL channel 122, if both of the performance of the DL channel 128 and the performance of the UL channel 126 between UE 106 and target NN 104 are good enough, it may be beneficial for UE 106 to trigger a handover from serving NN 102 to target NN 104 even if the performance of the DL channel 124 is the same as or better than the performance of the DL channel 128.

Accordingly, in some embodiments of this disclosure, UE 106 performs a handover process 600.

The handover process 600 may begin with step s602. In the step s602, UE 106 determines if any of the antenna arrangements of UE 106 is close to one or more sensitive objects. The sensitive objects may include a body part. Here, to help better understanding of the process 600, a person 108 is shown in FIG. 1 is used as an example of the sensitive object.

There are many different ways for UE 106 to determine if any of the antenna arrangements of UE 106 is close to a part of person 108. For example, UE 106 may use any one or a combination of a proximity sensor, a camera, and an impedance sensor to detect the presence of the human body 108 near one or more of antenna arrangements of UE 106. In this example, UE 106 determines that antenna arrangement 152 is close to a body part.

After determining that antenna arrangement 152 is close to a body part, in step s604, UE 106 may determine to reduce the performance of antenna arrangement 152, thereby reducing the performance (e.g., link budget) for UL channel 122.

UE 106 may reduce the performance of the antenna arrangement 152 in various ways. For example, UE 106 may reduce the maximum allowed UL output power of the antenna arrangement 152 (e.g., setting P-MPR to value above zero (e.g., 15 db)) such that the UL output power of the antenna arrangement 152 always stays below a threshold as long as the antenna arrangement 152 is close to the body 108.

After determining to reduce the performance of the antenna arrangement 152, in step s606, UE 106 may obtain a first performance indicator (PI) of the UL channel 122 and a second PI of the UL channel 126.

The first PI may indicate an estimated performance of the UL channel 122. Similarly, the second PI may indicate an estimated performance of the UL channel 126.

In some embodiments, the first PI is calculated based on the maximum allowed UL transmit (TX) power (TP1) (e.g., based on TP1 and on an estimated total gain (G1) of the UL channel 122). For example, the first PI is equal to the sum of TP1 and G1. Similarly, in some embodiments, the second PI is calculated based on the maximum allowed UL transmit (TX) power (TP2) and an estimated total gain (G2) of the UL channel 126. For example, the second PI is equal to the sum of TP2 and G2.

In some embodiments, each of the first PI and the second PI is an UL link budget. The UL link budget may be calculated based on any one or a combination of UL power control path gain measurements, closed loop power control commands, used output power of UE 106, modulation and coding schemes (MCS) used in UL data transmission, and DL reference signal received power (RSRP) measurements on SSBs and/or CSI-RSs.

Referring back to FIG. 6, after obtaining the first PI (PI1) and the second PI (PI2), in step s606, UE 106 may determine whether a handover triggering condition exists based on PI and PI2 (e.g., based at least in part on PI1 and PI2 or based solely on PI1 and PI2).

In some embodiments, whether the handover triggering condition exists may be determined based on whether the value of the second PI is greater than the value of the first PI by at least a threshold amount and the DL channel between UE 106 and target NN 104 is good enough (e.g., a measurement result, such as a filtered RSRP value, calculated based on measurements of DL reference signals transmitted by (e.g., broadcast by) target NN 104 is above a predetermined threshold). In other embodiments, whether the handover triggering condition exists may be determined based on a comparison of the first PI to a first threshold value and a comparison of the second PI to a second threshold value. For example, UE 106 may determine that the handover condition exists when the first PI is less than the first threshold value, the second PI is greater than or equal to the second threshold value, and the DL channel between UE 106 and target NN 104 is good enough.

Figure 6:
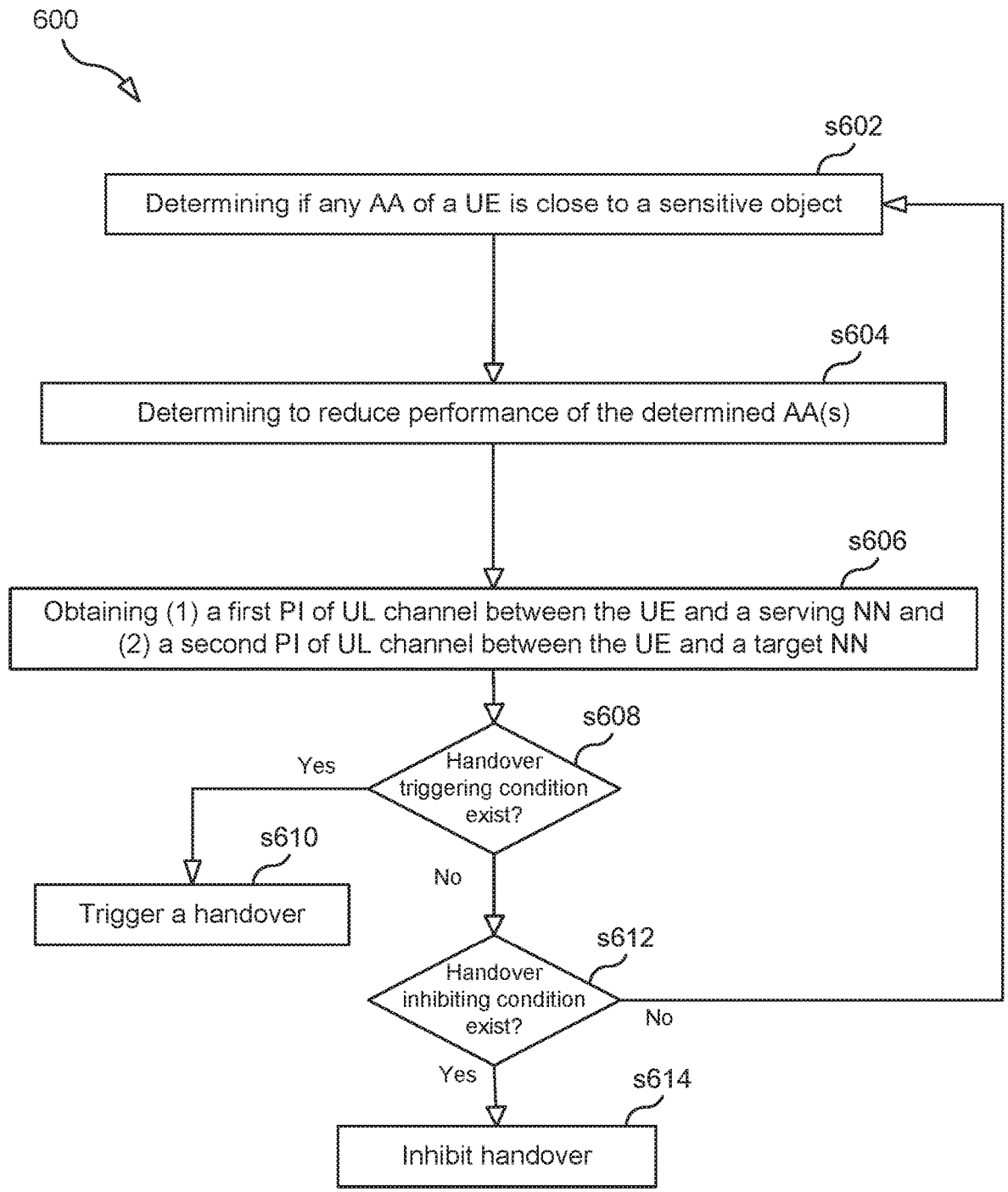
FIG. 6 illustrates a process of determining whether a handover condition exists according to some embodiments.

As discussed above, in conventional handover methods, a handover of UE 106 from source NN 102 to target NN 104 would not be performed if the performance of the DL channel 124 is greater than the performance of the DL channel 128. In other words, in conventional handover methods, a handover of UE 106 is decided mainly based on performance of the DL channels 124 and 128. As shown in FIG. 6, however, in some embodiments of this disclosure, the performance of the UL channels 122 and 126 is also considered in determining whether a handover triggering condition exists. Thus, as compared to the conventional handover methods (which might provide a UL channel with poor performance when the P-MPR is activated), the process 600 would result in providing a UL channel with acceptable performance.

In some embodiments, the determination of whether the handover triggering condition exists may be made further based on UE 106's potential use of the UL channel. For example, if UE 106 is not expected to transmit much UL data to serving NN 102, then, even when the performance of the UL channel 126 (i.e., the channel between the UE and the target NN) is greater than the performance of the UL channel 122 (i.e. the channel between the UE and the serving NN) and DL channel 128 is good enough, it may not be much beneficial to UE 106 to be handed-over from serving NN 102 to target NN 104 because the UL channel 122 might not be used much anyway.

Thus, in some embodiments, UE 106 may determine the actual amount of UL data to transmit (e.g., the amount of data in the UE's UL transmit buffer) and compare the determined amount of UL data to a threshold amount. If the determined amount of UL data is less than or equal to the threshold amount, UE 106 may determine that the handover triggering condition does not exist. Otherwise, UE 106 may determine that the handover condition exists.

In some embodiments, in addition to or instead of UE 106's potential use of UL channel 122, UE 106 may consider the amount of DL data in determining whether the handover triggering condition exists. For example, UE 106 may compare the amount of UL data that is to be sent to serving NN 102 to the amount of DL data that is to be received from serving NN 102. If the amount of UL data is less than the amount of DL data, then UE 106 may determine that the handover condition does not exist.

As a result of determining that the handover triggering condition exists, UE 106 triggers a handover of UE 106 from the NN 102 to the NN 104 (step s610). For example, in step s610 UE 106 transmits an MMR to serving NN 106, wherein the MMR is configured to cause serving NN 102 to initiate a handover process for the handover of UE 106 to target NN 104.

In some cases, UE 106 may be configured to send an MMR to serving NN 102 only when a particular event occurs. In such cases, as a result of UE 106 determining that the handover triggering condition exists, UE 106 may trigger a handover by immediately transmitting to serving NN 102 an MMR that triggers serving NN 102 to initiate a handover of UE 106 from serving NN 102 to target NN 104 (even when the performance of the DL channel 124 is better than the performance of the DL channel 128).

In some embodiments, the MMR may indicate that a first filtered measurement result based on measurements of DL reference signals transmitted by the target NN (e.g., the Fn value mentioned above) is offset better than a second filtered measurement result based on measurements of DL reference signals transmitted by the serving NN, even if this is not true.

In other cases, UE 106 may be configured to transmit an MMR to serving NN 102 periodically. In those cases, UE 106 may trigger the handover by modifying an MMR. For example, when UE 106 generates an MMR based on signals received from serving NN 102 and target NN 104, the MMR only indicates the performance of the DL channels 124 and 128. The MMR does not indicate the performance of the UL channels 122 and 126. Thus, if the MMR indicates that the performance of the DL channel 124 is better than the DL channel 128, serving NN 102 would not initiate a handover of UE 106 from serving NN 102 to target NN 104. Thus, in some embodiments, UE 106 modifies the MMR such that the modified MMR indicates that the performance of the DL channel 128 is better than the performance of the DL channel 124. After modifying the MMR, UE 106 sends to serving NN 102 the modified MMR. After receiving the modified MMR that indicates that the performance of the DL channel 128 is better than the performance of the DL channel 124, serving NN 102 may initiate a handover.

The disadvantage of triggering such "fake handovers" is that UE 106 is contradicting a standard specification. In the standard specification, UE 106 is expected to send MMRs that are truthful. By configuring UE 106 to send an MMR that does not reflect reality, the UE 106 is no longer consistent with the standard specification.

In some embodiments, instead of sending an MMR that does not reflect the actual measurements made by UE 106, UE 106 may turn off the first antenna arrangement 152, or a receiver chain associated with the first antenna arrangement 152, for a time interval (e.g., during a mobility measurement period or until a mobility measurement reporting event is triggered) such that the performance of the DL channel 124 becomes worse than the performance of the DL channel 128. While the first antenna arrangement 152, or the receiver chain is turned off, UE 106 may generate an MMR indicating that the performance of the DL channel 124 is worse than the performance of the DL channel 128, and send the MMR to serving NN 102.

After receiving the MMR, serving NN 102 may determine that the performance of the DL channel 124 is worse than the performance of the DL channel 128, and thus initiate a handover of UE 106 from serving NN 102 to target NN 104.

The advantage of triggering a handover by turning off the first antenna arrangement 152 is that, unlike the above other techniques, the behavior of UE 106 will be consistent with the standard specification.

In step s612, UE 106 determines whether a handover inhibiting condition exists based on PI1 and PI2 (e.g., based at least in part on PI1 and PI2). In some embodiments the handover inhibiting condition may exists when:

1) the performance of the DL channel between UE 106 and target NN 104 (i.e. channel 128) is offset better than the performance of the DL channel between UE 106 and serving NN 102 (i.e. channel 124), and 2) the performance of the UL channel between UE 106 and target NN 104 (i.e. channel 126) is threshold worse than the performance of the UL channel between UE 106 and serving NN 102 (i.e., channel 122).

In other embodiments the handover inhibiting condition may exists when:

1) the performance of the DL channel between UE 106 and target NN 104 is offset better than the performance of the DL channel between UE 106 and serving NN 102, 2) the performance of the UL channel between UE 106 and target NN 104 (i.e. channel 126) is threshold worse than the performance of the UL channel between UE 106 and serving NN 102 (i.e., channel 122), and 3) other conditions are present, such as, for example, UE 106 has at least a threshold amount of data in its UL transmit buffer and/or the expected amount of DL to be sent to UE 106 during a certain period of time is less than a threshold (e.g. less than the amount of the UE's UL data waiting to be sent).

As a result of determining that the handover inhibiting condition exists, UE 106 inhibits handover of UE 106 from serving NN 102 to target NN 104.

In some embodiments, UE 106 inhibits the handover by refraining from transmitting an MMR to serving NN 102 even though UE 106 has detected that DL channel 128 is threshold better than DL channel 122 (e.g., even though UE 106 has determined that Event A3 has occurred). In some embodiments, UE 106 inhibits the handover by transmitting a to serving NN 102 an MMR that does not indicate that DL channel 128 is threshold better than DL channel 122 even though that what UE 106 has detected.

Figure 7:
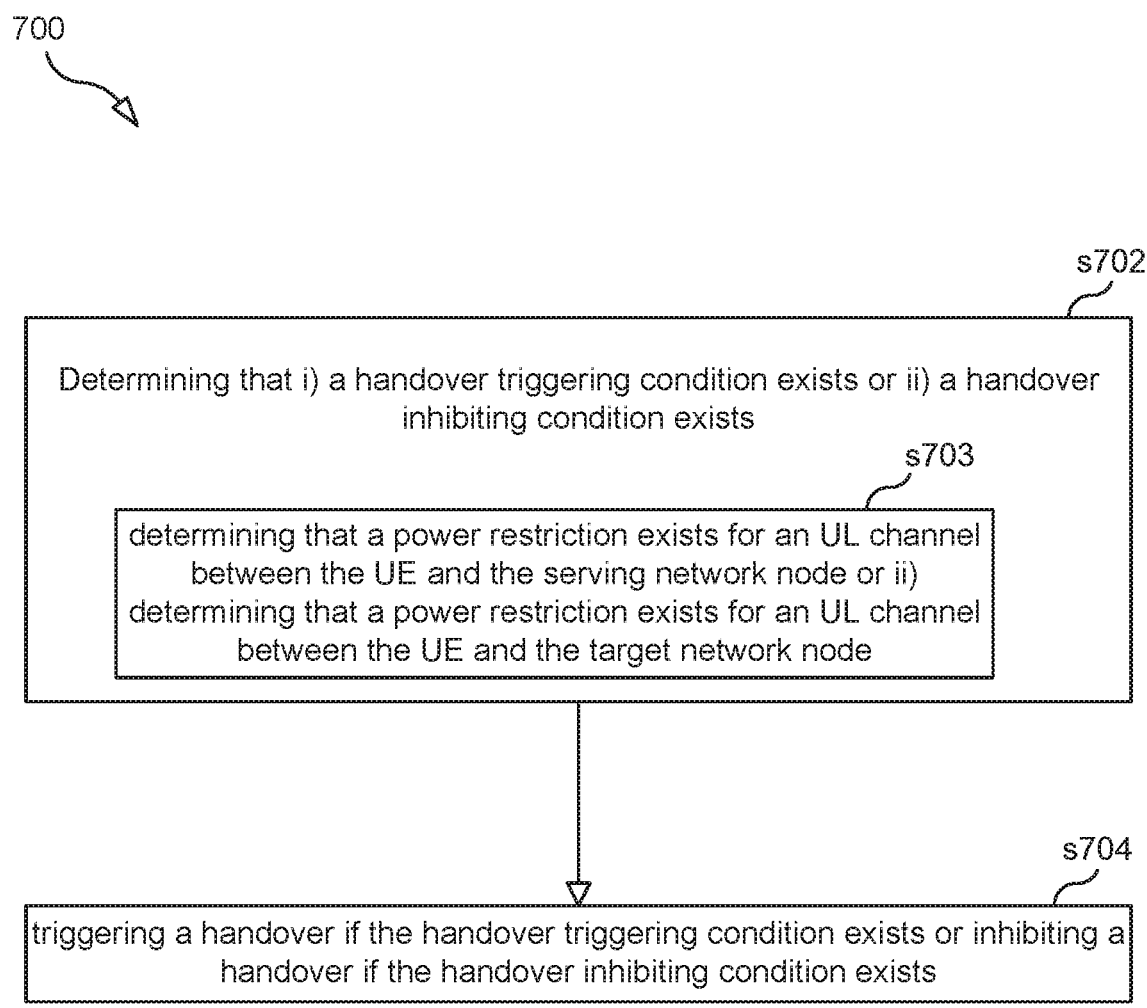
FIG. 7 illustrates a flow chart illustrating a process according to some embodiments.

FIG. 7 is a flow chart illustrating a high-level process 700 performed by UE 106. Process 700 may begin in step s702.

Step s702 comprises UE 106 determining that a handover condition exists, where the handover condition is a handover triggering condition or a handover inhibiting condition. Determining that the handover triggering condition exists comprises determining that a power restriction exists for the UL channel between the UE and the serving network node. Determining that the handover inhibiting condition exists comprises: i) determining that a power restriction exists for the UL channel between the UE and the target NN 104 or ii) determining that a power restriction exists for the UL channel between the UE and serving NN 102 (step s703). That is, the UE determines that a certain power reduction value (e.g., P-MPR) should be set to a value greater than zero.

Step s704 comprises, as a result of determining that the handover triggering condition exists, triggering a handover of the UE from the serving network node to a target network node, or, as a result of determining that the handover inhibiting condition exists inhibiting a handover of the UE from the serving network node to the target network node.

In some embodiments, determining that the handover condition exists may further comprise obtaining a first performance indicator (PI) indicating an estimated performance of the UL channel between the UE and the serving network node, obtaining a second PI indicating an estimated performance of an UL channel between the UE and the target network node, and determining whether a value of the second PI is greater than a value of the first PI by at least a threshold amount.

In some embodiments, determining whether the value of the second PI is greater than the value of the first PI by at least the threshold amount comprises calculating PI-Diff=PI1−PI2 and comparing PI-Diff to a threshold, where PI1 is the first PI, PI2 is the second PI.

In some embodiments, one or more UL channels exist between the UE and the serving network node and one or more UL channels exist between the UE and the target network node. In those embodiments, determining that the handover condition exists may further comprise obtaining a first aggregate performance indicator (PI) indicating an aggregate performance of said one or more UL channels between the UE and the serving network node, obtaining a second aggregate PI indicating an aggregate performance of said one or more UL channels between the UE and the target network node, and determining whether a value of the second aggregate PI is greater than the value of the first aggregate PI by at least a threshold amount.

Figure 8:
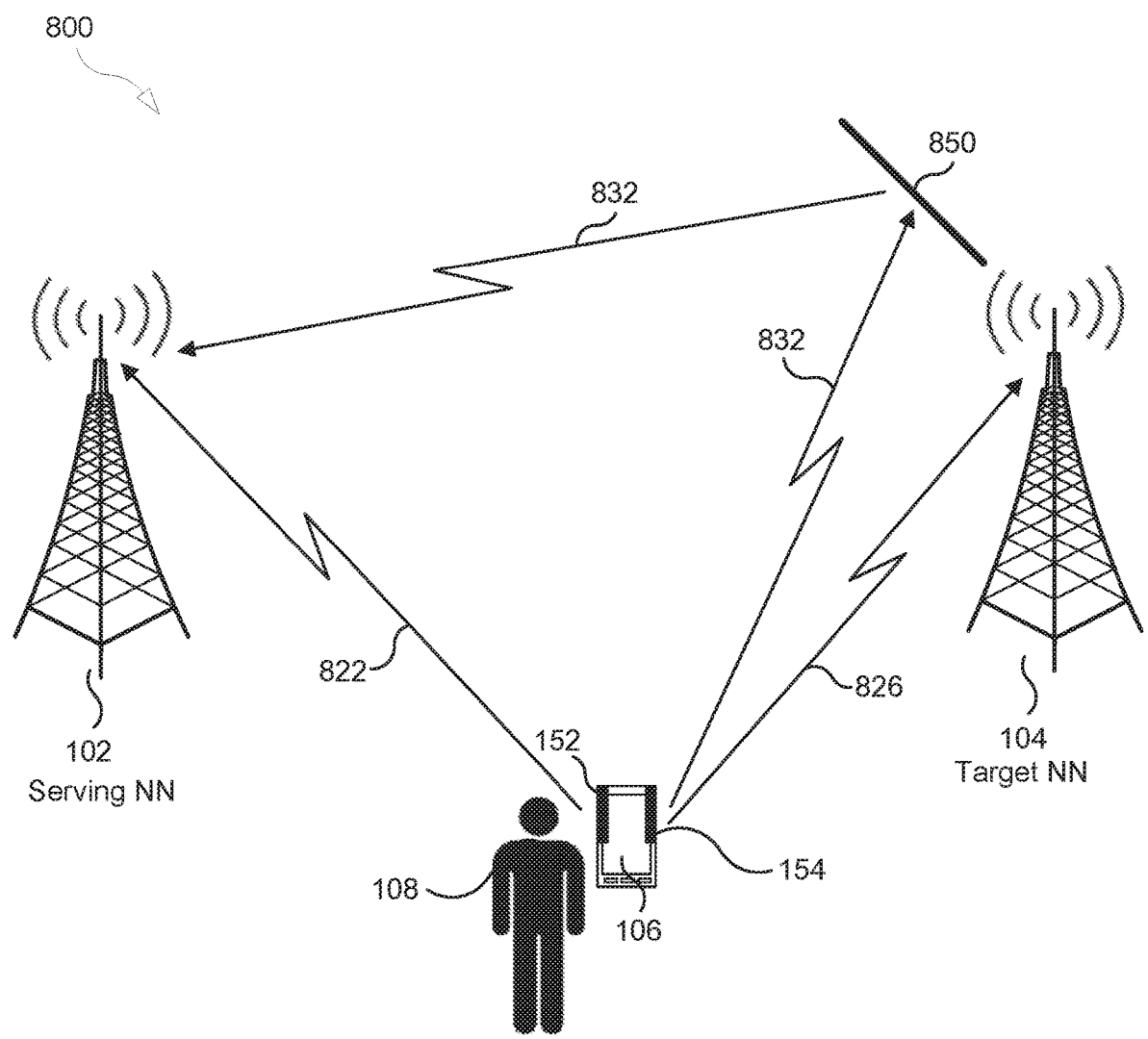
FIG. 8 illustrates a part of an exemplary communication system according to some embodiments.
Figure 9:
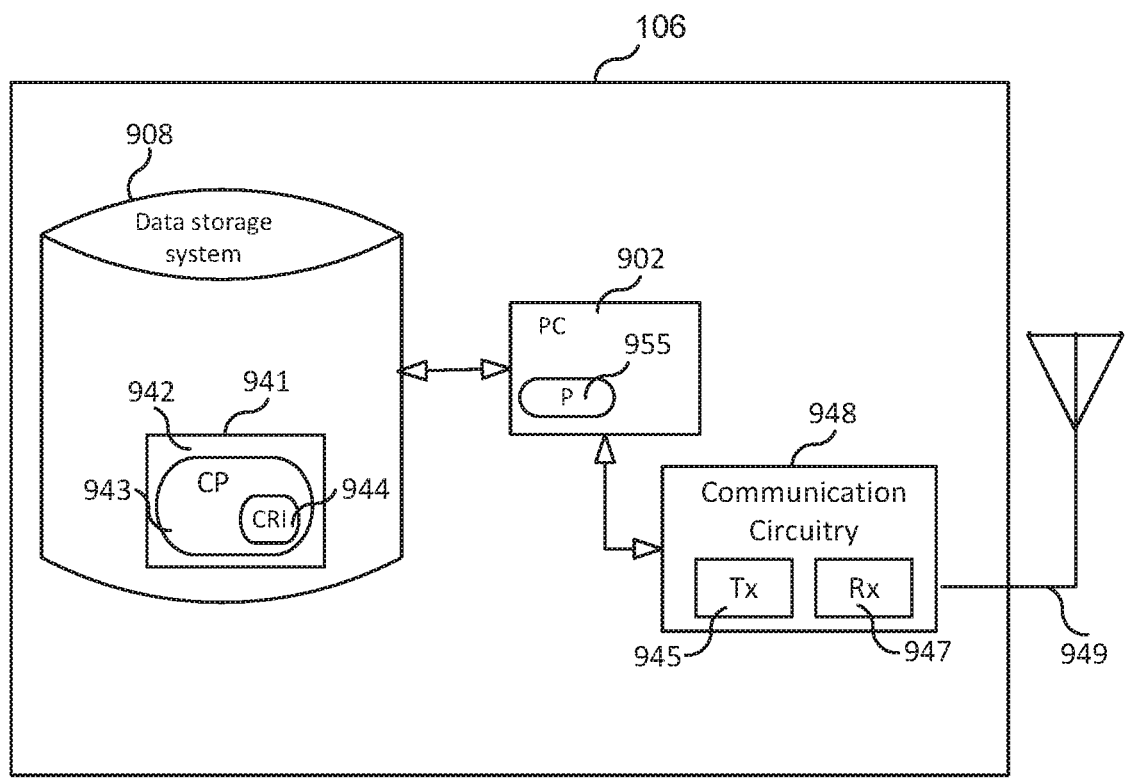
FIG. 9 is a block diagram illustrating an apparatus according to some embodiments.

For example, in the exemplary system 800 shown in FIG. 8, a direct (a.k.a., line-of-sight) UL channel 822 and an indirect UL channel 832 exist between the UE 106 and the serving NN 102. As shown in FIG. 8, the UL channel 832 is an indirect UL channel because signal(s) transmitted from the UE are delivered to the serving NN 102 using a reflection of the signal(s) by an object 850. Also, in the system 800, a UL channel 826 exists between the UE 106 and the target NN 104.

In the system 800, to determine whether a handover condition exists, (i) a performance of the UL channel 826 between the UE 106 and the target NN 104 and (ii) an aggregate performance of the UL channels 822 and 832 between the UE 106 and the target NN 104 are considered. The aggregate performance of the UL channels 822 and 832 may be calculated based on an individual performance of the UL channel 822 and an individual performance of the UL channel 832. For example, the aggregate performance may be equal to a sum of the performance of the UL channel 822 and the performance of the UL channel 832.

In some embodiments, determining whether the value of the second aggregate PI is greater than the value of the first aggregate PI by at least the threshold amount comprises calculating PI-Diff=PI1$_{aggregate}$−PI2$_{aggregate}$ and comparing PI-Diff to a threshold where PI1$_{aggregate}$ is the first aggregate PI and PI2$_{aggregate}$ is the second aggregate PI.

In some embodiments, determining whether the handover condition exists further comprises any one or combination of: determining an amount of UL data to be transmitted by the UE and comparing the determined amount to an UL data threshold, determining an amount of DL data expected to be received at the UE and comparing the determined amount to a DL data threshold, and comparing the amount of UL data and the expected amount of DL data.

In some embodiments, obtaining the first PI (PI1) comprises determining a first maximum allowable uplink transmit power and determining PI based on the first maximum allowable uplink transmit power and an estimated total gain of the UL channel between the UE and the serving network node, g1, and obtaining the second PI (PI2) comprises determining a second maximum allowable uplink transmit power and determining PI2 based on the second maximum allowable uplink transmit power and an estimated total gain of the UL channel between the UE and the target network node, g2. In some embodiment, the process also includes, as a result of determining that a power restriction exists for the UL channel between the UE and the serving network node, the UE sets a power reduction value (e.g. P-MPR) to value greater than zero; and the step of determining the first maximum allowable uplink transmit power comprises determining the first maximum allowable uplink transmit power using the power reduction value.

In some embodiments, obtaining the first aggregate PI (PI1$_{aggregate}$) may comprise determining a first maximum allowable uplink transmit power associated with each of said one or more UL channels between the UE and the serving network node and determining PI1$_{aggregate}$ based on (i) the first maximum allowable uplink transmit power associated with each of said one or more UL channels between the UE and the serving network node and (ii) an estimated total gain of each of said one or more UL channels between the UE and the serving network node. In those embodiments, obtaining the second aggregate PI (PI2$_{aggregate}$) may comprise determining a second maximum allowable uplink transmit power associated with each of said one or more UL channels between the UE and the target network node and determining PI2$_{aggregate}$ based on (i) the second maximum allowable uplink transmit power associated with each of said one or more UL channels between the UE and the target network node and (ii) an estimated total gain of each of said one or more UL channels between the UE and the target network node.

In some embodiments, said one or more UL channels between the UE and the serving network node may comprise a first UL channel and a second UL channel. In those embodiments, the method may further comprise as a result of determining that a first power restriction exists for the first UL channel, setting a first power reduction value (e.g., P-MPR) to a value greater than zero and as a result of determining that a second power restriction exists for the second UL channel, setting a second power reduction value to a value greater than zero. Determining the first maximum allowable uplink transmit power associated with the first UL channel may comprise determining the first maximum allowable uplink transmit power using the first power reduction value. Similarly, determining the first maximum allowable uplink transmit power associated with the second UL channel may comprise determining the first maximum allowable uplink transmit power using the second power reduction value.

In some embodiments, process 700 may further comprise sending to the serving network node a message including information that triggers the serving network node to initiate the handover of the UE from the serving network node to the target network node, where the sending is performed as a result of determining that the handover triggering condition exists.

In some embodiments, process 700 may further comprise, as a result of determining that the handover triggering condition exists, (i) modifying a mobility measurement report that indicates an actual strength of a signal received at the UE, wherein the signal was sent from the serving network node or from the target network node and (ii) transmitting to the serving network node a message including the modified mobility measurement report.

In some embodiments, the modified mobility measurement report may indicate that in case the signal was sent from the serving network node, the UE received a signal of which strength is lower than the actual strength of the signal received at the UE, and in case the signal was sent from the target network node, the UE received a signal of which strength is higher than the actual strength of the signal received at the UE.

In some embodiments, the UE may comprise a first antenna arrangement and a second antenna arrangement, and the process may further comprise as a result of determining that the handover triggering condition exists, turning off the first antenna arrangement, generating a mobility management report, and transmitting to the serving network node a message including the generated mobility management report.

In some embodiments, process 700 may further comprise as a result of determining that the handover inhibiting condition exists, (i) modifying a mobility measurement report that indicates actual strength of a signal received at the UE, wherein the signal was sent from the serving network node or from the target network node and (ii) transmitting to the serving network node a message including the modified mobility measurement report.

In some embodiments, the modified mobility measurement report may indicate that, in case the signal was sent from the serving network node, the UE received a signal of which strength is higher than the actual strength of the signal received at the UE, and, in case the signal was sent from the target network node, the UE received a signal of which strength is lower than the actual strength of the signal received at the UE.

In some embodiments, determining that the power restriction exists comprises detecting the presence of a portion of a human body proximate to an antenna arrangement of the UE.

FIG. 8 is a block diagram of UE 106, according to some embodiments. As shown in FIG. 8, UE 106 may comprise: processing circuitry (PC) 902, which may include one or more processors (P) 955 (e.g., one or more general purpose microprocessors and/or one or more other processors, such as an application specific integrated circuit (ASIC), field-programmable gate arrays (FPGAs), and the like); communication circuitry 948, which is coupled to an antenna arrangement 949 comprising one or more antennas and which comprises a transmitter (Tx) 945 and a receiver (Rx) 947 for enabling UE 106 to transmit data and receive data (e.g., wirelessly transmit/receive data); and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes UE 106 to perform steps described herein (e.g., steps described herein with reference to the flow charts). In other embodiments, UE 106 may be configured to perform steps described herein without the need for code. That is, for example, PC 902 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a user equipment (UE), the UE being served by a serving network node, the method comprising:
   determining whether a handover condition is satisfied, wherein the handover condition is a handover triggering condition; and
   as a result of determining that the handover triggering condition is satisfied, triggering a handover of the UE from the serving network node to a target network node,
   wherein
   determining whether the handover condition is satisfied comprises:
   i) determining that a power restriction exists for an uplink (UL) channel between the UE and the serving network node or ii) determining that a power restriction exists for an UL channel between the UE and the target network node;
   obtaining a first performance indicator (PI) indicating an estimated performance of the UL channel between the UE and the serving network node;
   obtaining a second PI indicating an estimated performance of an UL channel between the UE and the target network node; and using the first PI, which indicates the estimated performance of the UL channel between the UE and the serving network node, and the second PI, which indicates the estimated performance of the UL channel between the UE and the target network node, to determine whether the handover condition is satisfied, further wherein the method comprises the step of triggering the handover of the UE from the serving network node to a target network node as a result of determining that the handover triggering condition is satisfied, the method further comprises obtaining a first downlink performance indicator (DPI) indicating a performance of a downlink (DL) channel between the UE and the target network node, and the step of determining whether the handover triggering condition is satisfied comprises using the first PI (PI_1), the second PI (PI_2), and the first DPI (DPI_1) to determine whether the handover triggering condition is satisfied, wherein using the first PI (PI_1), the second PI (PI_2), and the first DPI (DPI_1) to determine whether the handover condition is satisfied comprises: comparing PI_2 to PI_1 and comparing DPI_1 with a threshold value, wherein comparing PI_2 to PI_1 comprises determining if PI_2 is greater than (PI_1+X), where X is a predetermined value, and the handover triggering condition is determined to be satisfied when: PI_2 is determined to be greater than (PI_1+X), and DPI_1 is greater than the threshold value.

2. The method of claim 1, wherein determining whether the handover condition is satisfied further comprises any one or combination of:

determining an amount of uplink (UL) data to be transmitted by the UE and comparing the determined amount to an UL data threshold, determining an amount of downlink (DL) data to be received at the UE and comparing the determined amount to a DL data threshold, and comparing the amount of UL data and the amount of DL data.

3. The method of claim 1, wherein the method further comprises obtaining a first estimated total gain (g1), wherein g1 is an estimated total gain of the UL channel between the UE and the serving network node, the method further comprises obtaining a second estimated total gain (g2), wherein g2 is an estimated total gain of the UL channel between the UE and the target network node, obtaining the first PI (PI_1) comprises determining a first maximum allowable uplink transmit power and determining PI_1 based on the first maximum allowable uplink transmit power and g1, and obtaining the second PI (PI_2) comprises determining a second maximum allowable uplink transmit power and determining PI_2 based on the second maximum allowable uplink transmit power and g2.

4. The method of claim 3, wherein the method further comprises, as a result of determining that a power restriction exists for the UL channel between the UE and the serving network node, setting a power reduction value to a value greater than zero; and determining the first maximum allowable uplink transmit power comprises determining the first maximum allowable uplink transmit power using the power reduction value.

5. The method of claim 1, the method further comprising:

as a result of determining that the handover triggering condition is satisfied, sending to the serving network node a message including information that triggers the serving network node to initiate the handover of the UE from the serving network node to the target network node.

6. The method of claim 1, the method further comprising:

as a result of determining that the handover triggering condition is satisfied, (i) modifying a mobility measurement report that indicates an actual strength of a signal received at the UE, wherein the signal was sent from the serving network node or from the target network node and (ii) transmitting to the serving network node a message including the modified mobility measurement report.

7. The method of claim 6, wherein the modified mobility measurement report indicates that:

in case the signal was sent from the serving network node, the UE received a signal of which strength is lower than the actual strength of the signal received at the UE, and in case the signal was sent from the target network node, the UE received a signal of which strength is higher than the actual strength of the signal received at the UE.

8. The method of claim 1, wherein the UE comprises a first antenna arrangement and a second antenna arrangement, and the method further comprises:

as a result of determining that the handover triggering condition is satisfied, turning off the first antenna arrangement;

after turning off the first antenna arrangement, generating a mobility management report; and transmitting to the serving network node the generated mobility management report.

9. The method of claim 1, the method further comprising:

as a result of determining that the handover inhibiting condition is satisfied, (i) modifying a mobility measurement report that indicates actual strength of a signal received at the UE, wherein the signal was sent from the serving network node or from the target network node and (ii) transmitting to the serving network node a message including the modified mobility measurement report.

10. The method of claim 9, wherein the modified mobility measurement report indicates that:

in case the signal was sent from the serving network node, the UE received a signal of which strength is higher than the actual strength of the signal received at the UE, and in case the signal was sent from the target network node, the UE received a signal of which strength is lower than the actual strength of the signal received at the UE.

11. The method of claim 1, wherein determining that the power restriction exists comprises detecting the presence of a portion of a human body proximate to an antenna arrangement of the UE.

12. A user equipment (UE), the UE comprising:

processing circuitry; and a memory, said memory containing instructions executable by said processing circuitry, whereby the UE is configured to perform a process comprising:

determining that a handover condition is satisfied, wherein the handover condition is a handover triggering condition or a handover inhibiting condition; and as a result of determining that the handover triggering condition is satisfied, triggering a handover of the UE from a serving network node to a target network node, or as a result of determining that the handover inhibiting condition is satisfied, inhibiting a handover of the UE from the serving network node to the target network node, wherein determining whether the handover condition is satisfied comprises:

i) determining that a power restriction exists for an uplink (UL) channel between the UE and the serving network node or ii) determining that a power restriction exists for an UL channel between the UE and the target network node;

obtaining a first performance indicator (PI) indicating an estimated performance of the UL channel between the UE and the serving network node;

obtaining a second PI indicating an estimated performance of an UL channel between the UE and the target network node; and using the first PI, which indicates the estimated performance of the UL channel between the UE and the serving network node, and the second PI, which indicates the estimated performance of the UL channel between the UE and the target network node, to determine whether the handover condition is satisfied, further wherein the method comprises the step of triggering the handover of the UE from the serving network node to a target network node as a result of determining that the handover triggering condition is satisfied, the method further comprises obtaining a first downlink performance indicator (DPI) indicating a performance of a downlink (DL) channel between the UE and the target network node, and the step of determining whether the handover triggering condition is satisfied comprises using the first PI (PI_1), the second PI (PI_2), and the first DPI (DPI_1) to determine whether the handover triggering condition is satisfied, wherein using the first PI (PI_1), the second PI (PI_2), and the first DPI (DPI_1) to determine whether the handover condition is satisfied comprises: comparing PI_2 to PI_1 and comparing DPI_1 with a threshold value, wherein comparing PI_2 to PI_1 comprises determining if PI_2 is greater than (PI_1+X), where X is a predetermined value, and the handover triggering condition is determined to be satisfied when: PI_2 is determined to be greater than (PI_1+X), and DPI_1 is greater than the threshold value.

13. A computer program product comprising a non-transitory computer readable medium storing a computer program, the computer program comprising computer program code which is able to, when run on processor circuitry of a user equipment (UE), cause the UE to perform a process comprising:

determining that a handover condition is satisfied, wherein the handover condition is a handover triggering condition or a handover inhibiting condition; and as a result of determining that the handover triggering condition is satisfied, triggering a handover of the UE from a serving network node to a target network node, or as a result of determining that the handover inhibiting condition is satisfied, inhibiting a handover of the UE from the serving network node to the target network node, wherein determining whether the handover condition is satisfied comprises:

i) determining that a power restriction exists for an uplink (UL) channel between the UE and the serving network node or ii) determining that a power restriction exists for an UL channel between the UE and the target network node;

obtaining a first performance indicator (PI) indicating an estimated performance of the UL channel between the UE and the serving network node;

obtaining a second PI indicating an estimated performance of an UL channel between the UE and the target network node; and using the first PI, which indicates the estimated performance of the UL channel between the UE and the serving network node, and the second PI, which indicates the estimated performance of the UL channel between the UE and the target network node, to determine whether the handover condition is satisfied, further wherein the method comprises the step of triggering the handover of the UE from the serving network node to a target network node as a result of determining that the handover triggering condition is satisfied, the method further comprises obtaining a first downlink performance indicator (DPI) indicating a performance of a downlink (DL) channel between the UE and the target network node, and the step of determining whether the handover triggering condition is satisfied comprises using the first PI (PI_1), the second PI (PI_2), and the first DPI (DPI_1) to determine whether the handover triggering condition is satisfied, wherein using the first PI (PI_1), the second PI (PI_2), and the first DPI (DPI_1) to determine whether the handover condition is satisfied comprises: comparing PI_2 to PI_1 and comparing DPI_1 with a threshold value, wherein comparing PI_2 to PI_1 comprises determining if PI_2 is greater than (PI_1+X), where X is a predetermined value, and the handover triggering condition is determined to be satisfied when: PI_2 is determined to be greater than (PI_1+X), and DPI_1 is greater than the threshold value.

\* \* \* \* \*

UNITED STATES PATENT AND TRADEMARK OFFICE
CERTIFICATE OF CORRECTION

PATENT NO. : 11,671,885 B2
APPLICATION NO. : 16/592387
DATED : June 6, 2023
INVENTOR(S) : Andreas Nilsson It is certified that error appears in the above-identified patent and that said Letters Patent is hereby corrected as shown below:

In the Specification

In Column 3, Line 38, delete "form" and insert -- from --, therefor.

In Column 6, Line 36, delete "PI" and insert -- PI1 --, therefor.

Signed and Sealed this
Twenty-eighth Day of November, 2023

Katherine Kelly Vidal
*Director of the United States Patent and Trademark Office*